Oct. 12, 1926.  
H. D. TANNER  
1,602,723  
GEARED DRIVING MEANS FOR MACHINE TOOLS  
Filed Jan. 9, 1924
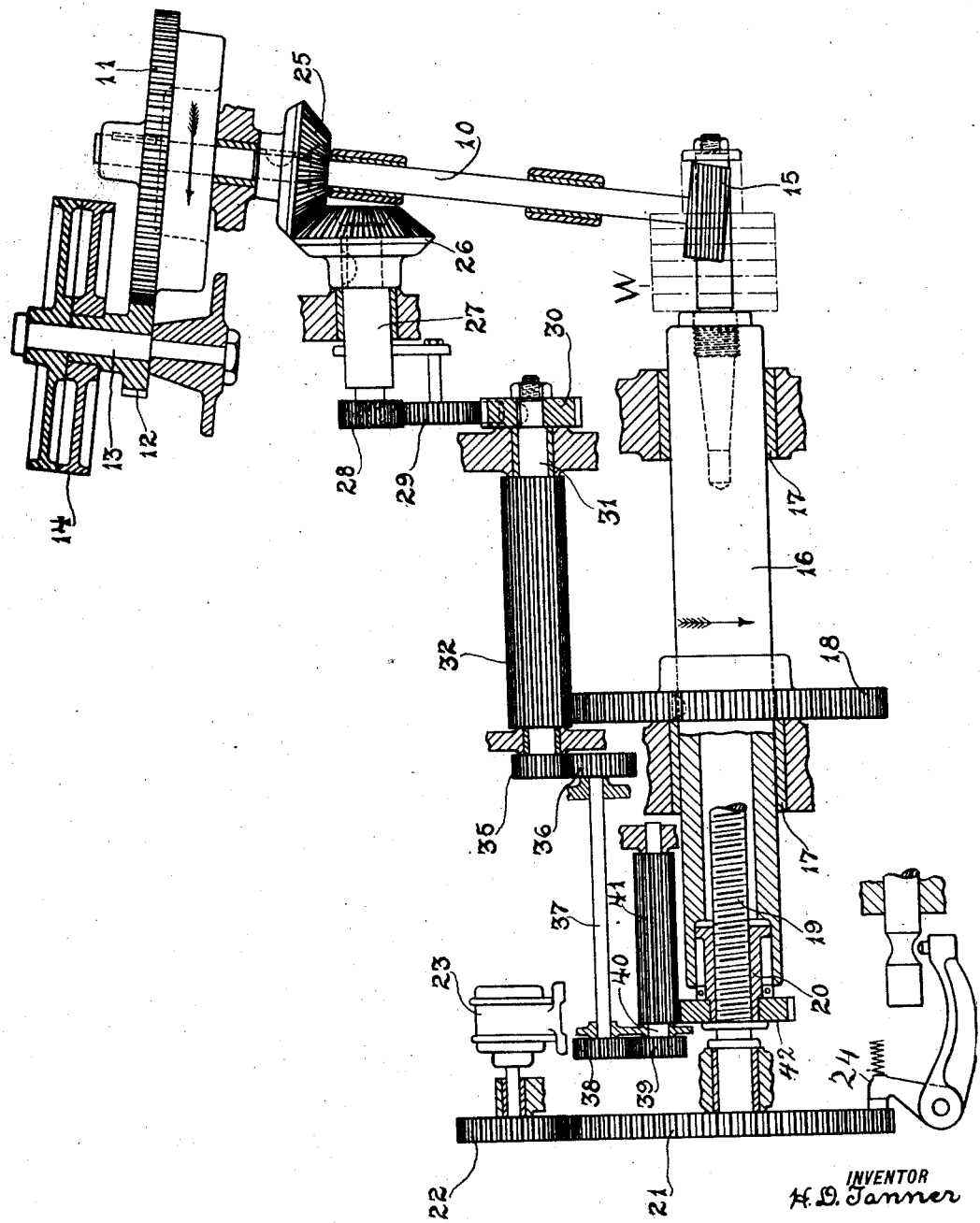
INVENTOR  
H. D. Tanner  
BY  
Joseph K. Schofield  
ATTORNEY Patented Oct. 12, 1926.

1,602,723

UNITED STATES PATENT OFFICE.

HUBERT D. TANNER, OF HARTFORD, CONNECTICUT, ASSIGNOR TO PRATT & WHITNEY COMPANY, OF NEW YORK, N. Y., A CORPORATION OF NEW JERSEY.

GEARED DRIVING MEANS FOR MACHINE TOOLS.

Application filed January 9, 1924. Serial No. 685,150.

This invention relates to an improved mechanism for driving machine tool elements and in particular to means for driving spindles connected to separated machine tool elements to be driven at precisely correct relative speeds.

It is an object of the present invention to provide a system of gearing for connecting separated machine tool elements such as a work spindle and tool or cutter spindle so that any errors in the gears forming this connecting mechanism will not seriously affect the precision of the work to be operated on.

The invention is illustrated in connection with driving connections between a hob supporting and rotating spindle and a gear blank supporting and rotating spindle, the driving connections comprising one pair of bevel gears and a plurality of spur gears, certain ones of which are interchangeable permitting the ratio between the two spindles to be widely varied.

Heretofore it has been the custom to drive the work spindle and hob spindle of a gear hobbing machine or other members of machine tools by geared means, the tooth numbers being selected merely to give the correct ratio between the two shafts or members. The present invention in addition to selecting the tooth numbers with respect to the particular ratios desired between the shafts or spindles selects them also to minimize, so far as possible, any inaccuracies in their tooth spacings or contours. It is the selection of such gears adapted to introduce the smallest possible errors that forms the principal object of the present invention.

In order to accomplish this, the gears are so chosen with relation to each other and with relation to the final driving gear on the work supporting and rotating spindle so that each gear in the train makes an integer number of revolutions during one complete rotation of the work spindle. It will be seen therefore that with each of the driving gears of the train in precisely identical positions at each complete rotation of the work spindle, all inaccuracies due to tooth contours or spacings will be confined to a small fractional part of a rotation of the work spindle. This is for the reason that the intermediate gears of the driving train make a relatively large number of rotations for one complete revolution of the work spindle. The influence of the individual errors of precision in the gears is therefore limited to exceedingly small amounts which will be identical for each successive revolution of the work spindle.

Another feature which is advantageous, particularly in the hobbing machine illustrated is that the drive proceeds from the hob supporting and rotating spindle to the work spindle. This is for the reason that the hob spindle is the most rapidly rotating of all of the shafts, thus permitting the power to be applied by a rapidly rotating gear in mesh with one directly on the hob spindle.

The invention is adapted to be carried out by choosing tooth numbers of the geared connections which are in so far as possible, even multiples of each other. Also, as above stated, the number of teeth in each of the gears is a factor of the number of teeth in the final driven gear.

With these and other objects in view, my invention consists in the construction and disposition of the parts set forth in the following specification and also illustrated in the accompanying drawing.

In the accompanying drawing annexed hereto and forming a part of this specification, I have shown my invention embodied in a spur gear hobbing machine but it will be understood that the invention can be otherwise embodied and that the drawing is not to be construed as defining or limiting the scope of the invention, the claims appended to this specification being relied upon for that purpose.

In the drawing, the figure shows a diagrammatic view of the elements for a gear hobbing machine, and their geared connections made according to the present invention.

In the above mentioned drawing, I have shown but one embodiment of my invention which is now deemed preferable but it is to be understood that changes and modifications may be made within the scope of the appended claims without departing from the spirit of the invention.

Briefly, my invention in its broadest aspect comprises the following principal parts: first, a hob supporting and rotating spindle; second, a work supporting and rotating spindle, these two spindles being relatively adjustable and movable so that they may be disposed properly for different sizes of hobs and gears to be formed and so that the gears being formed may be fed relative to the cutter; third, an intermediate shaft in driving connection with the hob spindle, preferably these driving connections being in the form of bevel gears having a one to one ratio; fourth, a second intermediate shaft preferably parallel to the first shaft and having geared driving connections between them; fifth, an elongated pinion on said second intermediate shaft; sixth, a large spur gear on the work spindle adapted to mesh with the elongated pinion; seventh, suitable feed mechanism preferably advancing the work spindle relatively to the hob; and eighth, driving means illustrated as in the form of a pulley and gear in mesh with a driving gear on the hob spindle.

Referring more in detail to the figures of the drawing, I show diagrammatically the complete lay-out of driving connections for a spur gear hobbing machine made in accordance with the present invention. This hobbing machine is of the same general type as that shown in the copending application of B. H. Blood, Serial No. 632,404 filed April 16, 1923. A hob spindle 10 suitably supported in any desired manner in or upon the frame of the machine is adapted to be rotated by means of a gear 11. This gear 11 is in mesh with a smaller gear 12 on the same shaft 13 with a driving pulley 14. This shaft 13 and pinion 12 are suitably mounted upon a bracket or frame so that rotation of the pulley 14 rotates the pinion 12 and the gear 11 in mesh therewith. This rotation of gear 12 and the spindle 10 may be at any desirable high speed suitable for the hobbing cutter 15 mounted at the opposite end of the spindle.

The work being operated on is in the form of circular disks W which are to be formed with spur gear teeth. These disks W are mounted on the forward end of a work supporting and rotating spindle 16 suitably mounted in bearings 17 provided in the base or frame of the machine. This spindle 16 is adapted to be rotated by means of a large spur gear 18 fastened directly thereto. It is also adapted to be fed axially so that the gear blanks W will be advanced past the hob 15 preferably by means of a screw 19 engaging a rotatable nut 20 housed rotatably within the work spindle 16. Driving means for this nut 20 may be provided by means presently to be described and means to rapidly return the spindle 16 may be provided by a gear 21 on the screw 19 in mesh with a pinion 22 on a shaft adapted to be rotated by a motor 23. A brake 24 holding the screw 19 and its gear 21 from rotating during operation is also provided. As these parts are fully disclosed in the copending application above mentioned, it will be unnecessary to describe them more in detail here.

Mounted on the hob supporting and rotating spindle 10 is a bevel gear 25 in mesh with a corresponding bevel gear 26 on an intermediate shaft 27 suitably supported rotatably on a part of the base or frame. The ratio between the bevel gears 25 and 26 is exactly one to one, that is, they have exactly the same number of teeth. Also mounted on this intermediate shaft 27 is a spur gear 28 in mesh with an intermediate or idler gear 29 which in turn is in mesh with a spur gear 30 on a second intermediate shaft 31. This second intermediate shaft 31 is provided with an elongated pinion 32 which engages directly with the driving gear 18 on the work spindle 16 in all of its axial positions. In order to change the ratio between the hob spindle 10 and the work spindle 16, the spur gear 30 on the second intermediate shaft 31 is made readily removable so that others having different numbers of teeth may readily be substituted. Also, the intermediate or idler gear 29 is made so that it may be swung about upon a bracket to properly mesh with the spur gears 28 and 30 on the two intermediate driving shafts.

A number of teeth in the elongated pinion 32 is selected which is a factor of the number of teeth in the large spur gear 18 on the work supporting and rotating spindle 16. With each complete revolution of the work spindle, the elongated pinion and its shaft will therefore make an integer number of revolutions. The spur gear 28 on the first intermediate shaft 27 is, as shown, a gear having a number of teeth equal to the number of teeth in the elongated pinion 32 and the spur gear 30 on the second intermediate shaft 31 is one having a number of teeth equal to the number of teeth in the gear to be hobbed. This disposition of gearing is selected for a hob having all of its cutting teeth upon a single helix. With the machine arranged for a double lead hob, the only change necessary to be made would be to use a gear 30 on the second intermediate shaft 31 equal exactly to one half the number of teeth in the gear to be hobbed.

It will be understood that in using a single start hob that the hob spindle 10 will make as many revolutions for each rotation of the work spindle 16 as there are teeth in the gear W being hobbed. With a double start hob, the number of revolutions will be one half that of the number of teeth in the gear being hobbed. In either case, the intermediate shafts 27 and 31 and their gears will make an integer number of revolutions when the work spindle rotates a complete revolution. If, therefore, there are any inaccuracies in the tooth spaces or contours of the gears, they will effect the relative rotative positions of the spindles 10 and 16 in exactly the same manner with each successive complete revolution of the work spindle. The errors therefore will not be apparent by the cutter marks on the gear being hobbed.

It will be understood also that in hobbing a gear having an odd number of teeth with a double start hob, the positions of the spindles 10 and 16 will be brought back to identical relative rotative positions when the work spindle 16 has completed two rotaions instead of but one. It will also be apparent that the idler gear 29 between the two intermediate shafts 27 and 31, although its number of teeth has no effect upon the ratio between the spindles 10 and 16, is chosen in relation to the number of teeth in the elongated pinion 32 and the gear 28 on the intermediate shaft 27. The particular gear 29 shown in this position has a number of teeth which is either equal to or a multiple of the number of teeth in the gear 28 on the first intermediate shaft 27. It is also a number which is a factor of the number of teeth in gear 18. This idler gear 29 therefore will complete an integer number of revolutions with each rotation of the work spindle.

Other particular numbers of teeth in the gears of the connecting means may be selected which will fulfill all of the functions of the invention. For instance, a gear 28 may be selected having double the number of teeth in gear 32. In this case, the number of teeth in gear 30 will be double the number of teeth in the gear being hobbed when a single start hob is used. With a double start hob, the number of teeth in gear 30 would be equal to the number of teeth in the gear being hobbed under the same conditions.

The means for feeding the work spindle 16 axially to advance the gear blanks W past the cutter 15 may be operated from shaft 31. For this purpose, a gear 35 is mounted on shaft 31 which is in mesh with a gear 36 on a shaft 37. Another gear 38 on shaft 37 meshes with a gear 39 on shaft 40. On shaft 40 is an elongated pinion 41 adapted to mesh with a gear 42 forming part of or mounted on nut 20. It will be seen therefore that rotation of nut 20 while screw 19 is restrained from rotating will advance the spindle 16 at any suitable speed for feeding the work W past the cutter 15.

What I claim is:

1. A gear hobbing machine comprising in combination, a base, a hob supporting and rotating spindle, a work supporting and rotating spindle, geared connecting means from said hob supporting spindle to said work supporting spindle, change gears in said means whereby the hob spindle may be rotated at predetermined but variable relative speeds, the number of teeth in the gears of said connecting means being such that each gear makes an integer number of revolutions with each complete rotation of the work spindle.

2. A gear hobbing machine comprising in combination, a base, a hob supporting and rotating spindle, a work supporting and rotating spindle, a driving gear on said hob spindle, a driven gear on said work spindle, geared means including change gears connecting said spindles, the number of teeth in the gears of said connecting means being such that each gear makes an integer number of revolutions with each rotation of the work spindle.

3. A gear hobbing machine comprising in combination, a base, a hob supporting and rotating spindle, a work supporting and rotating spindle, a driving gear on said hob spindle, a driven gear on said work spindle, intermediate shafts between said hob and work spindles, change gears between said intermediate shafts, gears connecting said intermediate shafts respectively to said hob and work spindles, each of said shafts with any ratio of change gears disposed between them adapted to make an integer number of revolutions with each rotation of the work spindle.

In testimony whereof, I hereto affix my signature.

HUBERT D. TANNER.